(12) United States Patent
Hanson et al.

(10) Patent No.: US 10,255,280 B2
(45) Date of Patent: Apr. 9, 2019

(54) UNIVERSAL PARSING FRAMEWORK SYSTEMS AND METHODS

(71) Applicant: Open Text GXS ULC, Halifax (CA)

(72) Inventors: Phil Hanson, Richardson, TX (US); Kris Loia, Richardson, TX (US)

(73) Assignee: Open Text GXS ULC, Halifax (CA)

( * ) Notice: Subject to any disclaimer, the term of this patent is extended or adjusted under 35 U.S.C. 154(b) by 58 days.

(21) Appl. No.: 15/467,791

(22) Filed: Mar. 23, 2017

(65) Prior Publication Data

US 2017/0277677 A1    Sep. 28, 2017

Related U.S. Application Data

(60) Provisional application No. 62/312,088, filed on Mar. 23, 2016.

(51) Int. Cl.
*G06F 17/27* (2006.01)
*G06F 17/30* (2006.01)

(52) U.S. Cl.
CPC .................. *G06F 17/30* (2013.01)

(58) Field of Classification Search
USPC ................ 704/1–10, 230–257, 270–277
See application file for complete search history.

(56) References Cited

U.S. PATENT DOCUMENTS

2008/0201697 A1*   8/2008  Matsa ............... G06F 17/2705
                                                    717/143

* cited by examiner

*Primary Examiner* — Huyen X Vo
(74) *Attorney, Agent, or Firm* — Sprinkle IP Law Group

(57) ABSTRACT

An applicant can instantiate a parsing framework, provide an input stream, attach observers, and initiate parsing, which inverts control to the parsing framework. The parsing framework can have an observer manager, a parser controller, and parsers. The observer manager manages observer design patterns from which the observers are instantiated. The parser controller determines which parser would be appropriate for parsing the input stream and instantiate the appropriate parser(s). The parser controller gets the callbacks from the parsers and communicates outcomes to the observer manager. The observer manager determines which of the observers is to be notified, generates parsing notifications accordingly, and dispatches the parsing notifications directly to the observers. The application can be any application that needs parsing in an electronic information exchange platform. The input stream can be created by the application opening a document received from a backend system communicatively connected to the electronic information exchange platform.

20 Claims, 11 Drawing Sheets

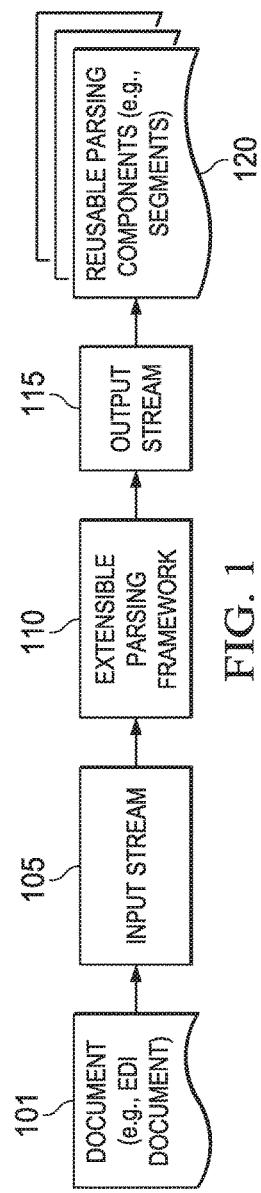
FIG. 1
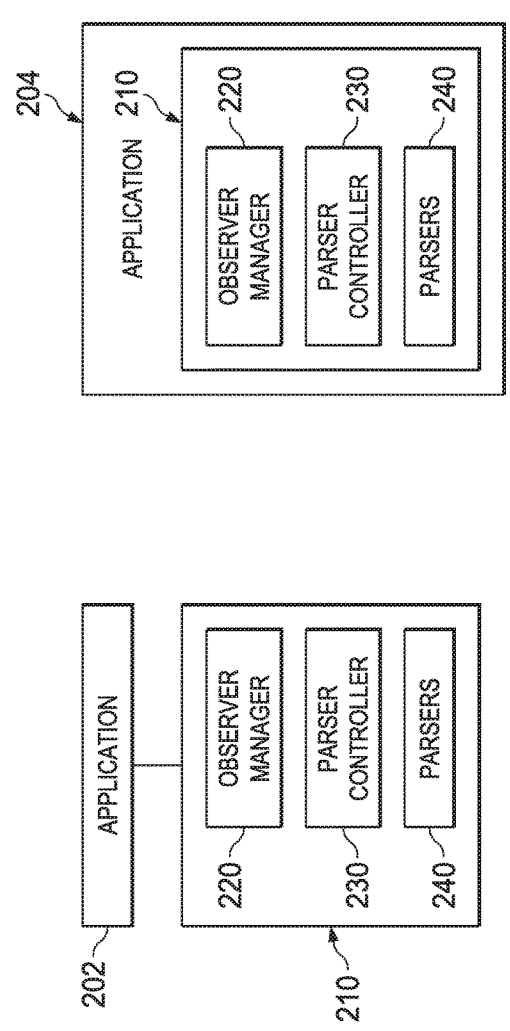
FIG. 2A
FIG. 2B

```
public class MyEDIObserver extends ParsingObserver {
    Integer ediType = 0;
    @Override
    public void update (Observable o, Object arg)  {
        EdiHandler ediHandler = (EdiHandler) arg;
        EDISegmentData ediSegmentData = ediHandler.getSegment () ;
        String segmentTag = ediSegmentData.getTag ();
        System.out.println("segment:"+segmentTag);
        if(ediTypes.get(ediType-1).equalsIgnoreCase("X12")) {
            if(segmentTag.equalsIgnoreCase("ISA")) {
                System.out.println("senderId_ISA06:"+ediSegmentData.getElementValue (6,1,1)+
                    ",receiverId_ISA08:"+ediSegmentData.getElementValue(8,1,1));
            }
        }
    }
    public void startParse(){
        System.out.println("----------->startParse") ;
    }
    public void endParse(){
        System.out.println("----------->endParse") ;
    }
    public void setEdiDataType(Integer type) {
        System.out.println("----------->setEdiDataType:"+ediTypes.get(type-1));
        ediType=type;
    }
    public void startInterchange () {
        System.out.println("----------->startInterchange");
    }
}
```

FIG. 7

```
public class ParsingServiceWrapper {

ArrayList<String> ediTypes = new ArrayList<String> (Arrays.asList ("EDIFACT", "Tradacoms", "X12"));

public void doEDI (InputStream aStream, String format, String encoding) {
        ObservableParser observableParser = new ObservableParser ("Observable Parser", aStream, format, encoding);

MyEDIObserver MyEDIObserver = new MyEDIObserver ();
        List<String> interests = new ArrayList<String>();
        interests.add (ObservableParser.PARSING_INTEREST_EDI_KEY_COLLECTION);   //ediKeyCollection
        List<ParsingSubject> ParsingSubjects = observableParser.getSubjects (interests);   //..tgparsing.subjects.EdiHandler
        parsingSubjects.get(0).attach(myEDIObserver, ObserverableParser.PARSING_INTEREST_EDI_KEY_COLLECTION);

try {
            System.out.println("======================================== E D I ========================================");
            observableParser.parse() ;
        } catch (Exception e) {
            e.printStackTrace() ;
        }
    }
}
```

============================= E D I =============================
INFO: tgparsing Logger configured
-------------->startParse
-------------->setEncodingType:UTF-8: Eight-bit Unicode Transformation Format
-------------->setEdiDataType:X12
-------------->startInterchange segment:ISA
senderId_ISA06 : PARTYB000        ,receiverId_ISA08 : PARTYA000
-------------->startGroup segment: GS -------------->startTransaction segment:ST
segment:BEG
segment:CUR
segment:TAX
segment:FOB
segment:N1
segment:PER
segment:N1
segment:PER
segment:N1
segment:PER
segment:N1
segment:N1
segment:PO1
segment:PID
segment:SCH
segment:PO1
segment:PID
segment:SCH
segment:PO1
segment:PID
segment:SCH
segment:CTT
segment:AMT
-------------->endTranaction
segment:SE
-------------->endGroup
segment:GE
segment:IEA
-------------->endInterchange Char count:878
-------------->endParse

UNIVERSAL PARSING FRAMEWORK SYSTEMS AND METHODS

CROSS-REFERENCE TO RELATED APPLICATION(S)

This is a conversion of and claims a benefit of priority from U.S. Patent Application No. 62/312,088, filed Mar. 23, 2016, entitled "SYSTEMS, METHODS AND FRAMEWORK FOR UNIVERSAL PARSING," the entire disclosure of which is fully incorporated by reference herein for all purposes.

TECHNICAL FIELD

This disclosure relates generally to data processing in a network computing environment. More particularly, this disclosure relates to an extensible parsing framework for processing data streams and systems and methods implementing same.

SUMMARY OF THE DISCLOSURE

In this disclosure, a Trading Grid or TG refers to a hosted process integration platform such as the OpenText GXS Trading Grid®. The Trading Grid operates in a cloud computing environment to facilitate the real-time flow or exchange of information between disparate entities such as enterprises regardless of standards preferences, spoken languages, or geographic locations. Accordingly, the Trading Grid may also be referred to as an electronic information exchange platform.

The Trading Grid may be embodied on server machines that support an electronic communication method referred to as the Electronic Data Interchange (EDI) used by enterprise computers that are independently owned and operated by various entities. To enable these entities to exchange documents electronically in a secure, fast, and reliable manner, the Trading Grid provides multiple managed services such as translation services, format services, copy services, email services, document tracking, messaging, document transformation (for consumption by different computers), regulatory compliance (e.g., legal hold, patient records, tax records, employment records, etc.), encryption, data manipulation (e.g., validation), etc. to the enterprise computers.

Embodiments disclosed herein are directed to an extensible parsing framework that can support various applications and managed services alike in the Trading Grid. Recognizing that the Trading Grid is uniquely positioned to process data/documents from various entities that utilize the Trading Grid, the extensible parsing framework can extract information from all the input streams. The extracted information can provide useful insight as to the universality for all of the data flowing through the Trading Grid among trading partners (entities). For example, analytics can be run on the extracted information to understand the semantics of all the documents being traded on the Trading Grid at a given time. An authorized user may, via a web based interface, view a representation of a document and indicate what field(s) or key(s) should be parsed out (extracted) and stored in a central metadata repository for use by downstream service(s). Such reusable parsing components are outputs of metadata-driven parsing. Additionally or alternatively, parsing can be driven by business document definition (BDD).

In some embodiments, a parsing framework may include an observerable/inversion of control (IOC) layer, a parser controller layer, and a layer of various parser implementations. An observer manager may reside at the IOC layer and communicates with an application. A parser controller may reside at the parser controller layer and communicates with the various parser implementations. Interfaces among these layers may be defined and formalized via callback methods.

In some embodiments, a process flow in the parsing framework may include receiving, by the observer manager, an input stream, format information on the input stream, and programmatic control from an application. The application may be associated with observers, each of which may be associated with a function of the application. The observers are instantiated by the application and then attached to the parsing framework (e.g., by registering with the observer manager).

The observer manager communicates the input stream and the format information to the parser controller which, in turn, determine which parser(s) should be instantiated based at least in part on the format information on the input stream. The parser controller then instantiates the appropriate parser(s). The instantiated parser(s) operate to parse the input stream in a single pass, during which the observer manager may: determine which observer(s) is/are to be notified based at least in part on an output from the at least one parser; generate a parsing notification(s) accordingly; and dispatching the parsing notification(s) directly to the observer(s) thus determined. The outcome (e.g., parsed data) from the parser(s) may comprise reusable parsing components such as a record, a field of the record, a file, or a segment of the file that can be reused by the application.

In the parsing framework, the parser controller separates the parsers from the observer manager. Likewise, the observer manager decouples the observers from the parsers. This structure insulates the parsers from an application that utilizes them.

In some embodiments, the parsing framework is instantiated by the application running on a server machine. In some embodiments, the application may run on a multi-tenant platform in a cloud computing environment. In some embodiments, the application may be one of a plurality of applications running on the Trading Grid. In some embodiments, the parsing framework may be part of a set of lightweight library that can be used by the application and/or other applications representing different technologies running on the Trading Grid.

In one embodiment, a system may comprise at least one processor, at least one non-transitory computer-readable storage medium, and stored instructions translatable by the at least one processor to implement a process flow substantially as described herein. Another embodiment comprises a computer program product having at least one non-transitory computer-readable storage medium storing instructions translatable by at least one processor to perform a method substantially as described herein. Numerous other embodiments are also possible.

Embodiments disclosed herein can provide many advantages. For example, the reusable library framework can easily extend parsing capability. Parsing is decoupled from the ability to observe any collection or number of bits of information on documents being parsed. This approach can provide reusability for the parsers and eliminate the need to hard code a program to parse and/or to connect one parser to one observer.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 1 depicts a diagrammatic representation of a logic flow for a parsing framework according to some embodiments.

FIGS. 2A-2D depict diagrammatic representations of example implementations of a parsing framework according to some embodiments.

FIG. 7 provides an example of an observer snippet to print segments of an input stream according to some embodiments.

FIG. 8 provides an example of an attachment method for registering an observer with a parsing framework according to some embodiments.

FIG. 9 provides an example of a parsing outcome by a parsing framework according to some embodiments.

DETAILED DESCRIPTION

Figure 2C:
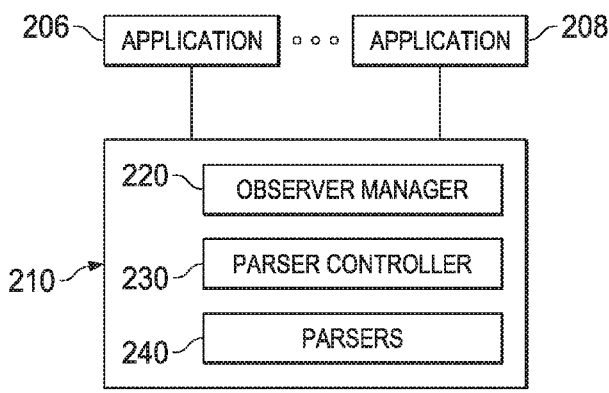
Figure 2D:
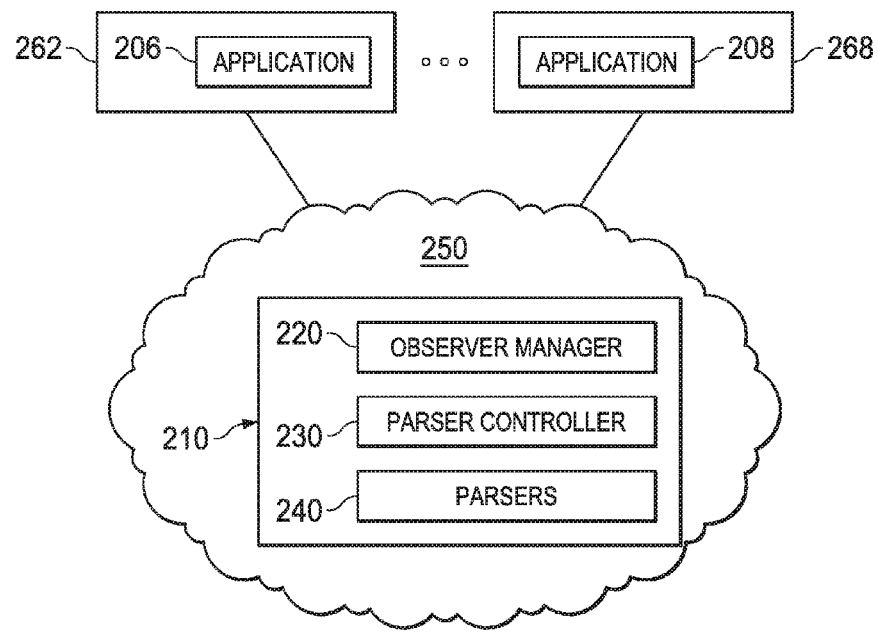

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Referring to FIG. 1, in this disclosure, parsing refers to the syntactic analysis of input stream 105 by parsing framework 110 to produce output stream 115. Specifically, parsing framework 110 may operate to parse document 101 in input stream 105 into reusable parsing component parts 120 that can be stored via output stream 115. Reusable parsing components 120 can be used/reused in a Trading Grid, explained above. In some embodiments, parsing framework 110 operates at a level below an application layer. This is further explained below. In some embodiments, parsing framework may be extensible. This is also explained below.

Skilled artisans appreciate that an input stream can be considered a programming event. Technically, a parser in parsing framework 110 is not given a file name, nor does the parser "open" a file to read. Rather, the parser is given an input stream of data from a file that has already been opened and the parser reads from the input stream. Accordingly, from a programming perspective, it is a programmatically readable object, rather than a file name, that is passed to the parser and the parser can read from this object. In Java, such an input stream is called Java.file.iostream. Java usually comes with a package (e.g., a "java.io" package) that contains input/output (I/O) classes to support the input and output through bytes stream and file system. These I/O streams represent an input source and an output destination. An application can open a file (e.g., document 101) and pass input stream 105 to parsing framework 110 for the parser to read. At this point, control of processing input stream 105 is inverted from the application.

Each parser in parsing framework 110 performs a particular parsing function. They do not need to know how the file is technically stored. Rather, once a parser is stated (e.g., by a parser controller, described below), it may perform a particular analysis on the incoming data, break it into parts according to a result of the analysis, perform callback methods with its findings, and repeat this process until there is nothing to read and no more callbacks need to be made, at which point the parsing ends and control is returned to the application. Many downstream activities can occur at this point, for instance, creating output stream 115 from parsed data and/or storing reusable segments 120 (e.g., segments parsed from document 101) that can be reused by the application in a file system.

Before discussing embodiments of parsing framework 110 in detail, examples of where parsing framework 110 may be implementing in various types of computing environments maybe helpful. FIGS. 2A-2D depict diagrammatic representations of non-limiting example implementations of a parsing framework according to some embodiments. Referring to FIG. 2A, in some embodiments, parsing framework 210 may be instantiated by application 202 running on a server machine in a Trading Grid (e.g., Trading Grid computer 516 shown in FIG. 5). Parsing framework 210 may include observer manager 220, parser controller 230, and parsers 240. These components are further described below with reference to FIG. 3. As illustrated in FIG. 2B, in some embodiments, parsing framework 210 may be embedded in application 204 (e.g., as part of a library for application 204). In some embodiments, parsing framework 210 may be part of a set of lightweight library that can be used by applications 206 . . . 208 representing different technologies running on a Trading Grid, as illustrated in FIG. 2C. In some embodiments, applications 206 . . . 208 may be delivered to enterprise computers 262 . . . 268 as managed services provided by a Trading Grid operating on a multi-tenant platform in cloud computing environment 250, as exemplified in FIG. 2D. As described above, enterprise computers 262 . . . 268 may be associated with disparate entities that are trading partners that utilize the Trading Grid to exchange information. Other implementations may also be possible. Thus, FIGS. 2A-2D are meant to be illustrative and non-limiting.

Figure 3:
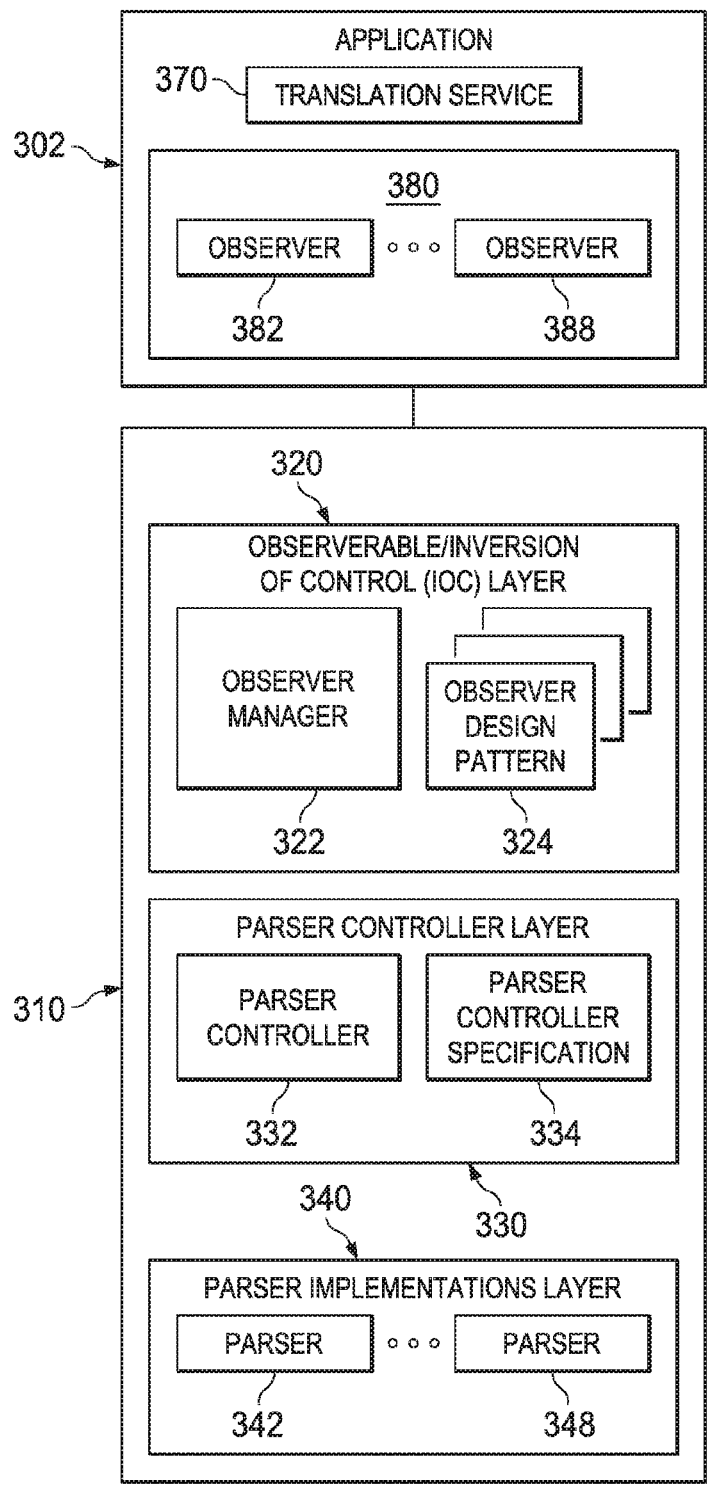
FIG. 3 depicts a diagrammatic representation of a parsing framework according to some embodiments.

FIG. 3 depicts a diagrammatic representation of parsing framework 310 according to some embodiments. In the example shown, parsing framework may include an observerable/inversion of control (IOC) layer 320, parser controller layer 330, and various parser implementations at layer 340. In some embodiments, layers 320, 330, and 340 represent coding layers of parsing framework 310. Inversion of control refers to a software engineering principle in which custom-written portions of a computer program receive the flow of control from a generic framework. Unlike in libraries or in standard user applications, the overall program's flow of control is not dictated by the caller, but by the framework. Inversion of control is known to those skilled in the art and thus is not further described herein.

In the example of FIG. 3, observer manager 322 may reside at the IOC layer 320 and communicate with application 302. Observer manager 322 may manage observer design patterns 324 of observers 382 . . . 388 residing at observer layer 380 of application 302. As illustrated in FIG. 3, observer layer 380 can be decoupled from translation service 370 provided by application 302. Skilled artisans appreciate that translation service 370 represents a non-limiting example of a managed service provided by the Trading Grid. Other managed services (e.g., key collection service, splitting service, messaging services, mailbox services, etc.) may also utilize parsing framework 310. Such managed services and applications alike may require parsing and may utilize parsing framework 310 for their parsing needs. Furthermore, as discussed above, parsing framework 310 can be encapsulated in an independent lightweight reusable library and need not be coupled to translation service 370 in some implementations.

As illustrated in FIG. 3, TG services (e.g., translation service 370) and observers (e.g., observers 382 . . . 388) at the application layer are decoupled from the parsing components (e.g., parsers 342 . . . 348) of parsing framework 310. Parsing framework 310 may store IOC/callback patterns (e.g., observer design patterns 324) for use by application 302, for instance, as part of a programming library for application 302. In this disclosure, an observer design pattern refers to a software design pattern in which an object (which is also referred to as a "subject") maintains a list of its dependents (which are also referred to as "observers") and notifies them automatically of any state changes, often by calling one of their methods.

In the example of FIG. 3, parser controller 332 may reside at parser controller layer 330. Parser controller 332 may be particularly configured for instantiating appropriate parser(s) 342 . . . 348 at parser implementation layer 340. In this disclosure, a parser refers to a software component particularly programmed to analyze a document syntactically to look for certain information and let parsing framework 310 know what it found. In some embodiments, parsers 342 . . . 348 can be written to handle fixed-length files, XML files, all various types (including future ones) with different behaviors and formats.

In some embodiments, parser controller 332 can provide a common interface to disparate parsers 342 . . . 348. For example, parser controller 332 can convert or otherwise process callback methods utilized by parsers 342 . . . 348 into a common form, if needed. That is, parsing framework 310 can provide two layers of separation—parser controller 332 can separate parsers 342 . . . 348 from observer manager 322 (and hence isolating parser implementation layer 340 from IOC layer 320) and observer manager 322 can separate parser controller 332 from observers 382 . . . 388 (and hence isolating observer layer 380 and application 302 from parser controller layer 330 and parser implementation layer 340).

In some embodiments, parser controller 332 can be hard-coded to include knowledge of parsers 342 . . . 348. In some embodiments, a parser can be added via dependency injection. Dependency injection can allow parser controller 332 to be plugged into or otherwise registered with parser controller 332. Such a registerable new parser may be configured based at least in part on parser controller specification 334 such that the new parser can communicate and interface with parser controller 332. By allowing an external parser to dynamically plug into parser controller 332 (e.g., to replace an existing parser and/or to add a new parsing functionality) by dependency injection, parsing framework 310 can be dynamically extensible to extend its parsing capabilities.

Interfaces among layers 320, 330, and 340 may be defined and formalized via callback methods that call into custom or task-specific code. For example, in some embodiments, parser controller 332 can communicate a callback from a parser to observer manager 322. In turn, observer manager 322 may determine which observer at observer layer 380 should be notified. Appropriate observer(s) is/are awaken by observer manager 322 whenever something the particular observer(s) is/are interested is found. Different observers can have different interests. It is possible that multiple observers may be interested in the same information. If so, observer manager 322 can broadcast the information found to multiple observers at observer layer 380.

Figure 4:
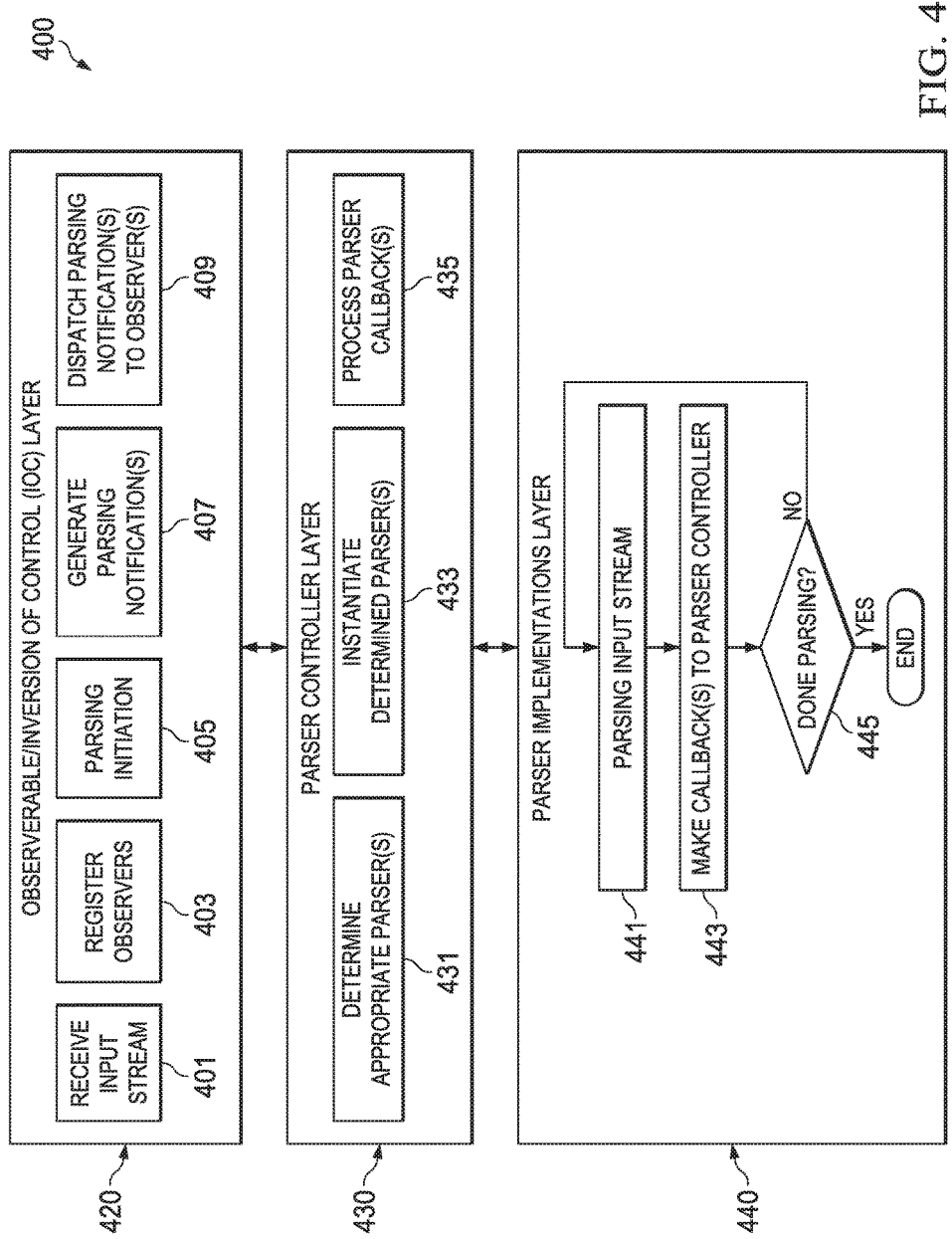
FIG. 4 depicts an example process flow for a parsing framework according to some embodiments.

As skilled artisans can appreciate, at IOC layer 320, control is inverted from application 302 to parsing framework 310 so that parsing on an input stream can be performed. This process flow is further described with reference to FIG. 4.

In some embodiments, an application may instantiate a parsing framework to begin process flow 400. This can be any application that needs parsing done in the Trading Grid. As discussed above, trading partners (e.g., represented by enterprise computers 262 . . . 268 in FIG. 2D) may utilize the Trading Grid to send electronic information to its partner(s). This communication can be triggered by a backend system at a Trading Partner (network). For example, an Enterprise Resource Planning (ERP) System may send an ERP document containing purchase orders (POs) to its vendors. The Trading Grid is configured for receiving that ERP document and sending it to an internal process (internal to the Trading Grid) in which data services can be performed on the data (e.g., POs) contained in the ERP document. For example, the trading partner may want the POs tracked. Thus, for tracking purposes, the Trading Grid may direct the ERP document to the parsing framework. The parsing framework may parse the POs (e.g., perform a syntactic analysis to understand the structure of the POs) and create an audit record to track by PO. The POs may be organized, sorted, packaged, and then delivered to their respective destinations. The journey of an electronic file through the Trading Grid can be referred to as an itinerary. When an electronic file is received by the Trading Grid, an itinerary is created so the Trading Grid can perform the desired data services and orchestrate each electronic file's journey from one trading partner to its trading partner(s).

Many backend systems at the trading partners may be communicatively connected to the Trading Grid. In addition to ERP systems, any system that supports back-office applications can be backend systems operating in respective trading partner networks. These systems may have disparate application formats and/or data structures. Often parsing is needed for the Trading Grid to understand the syntax and/or encoding of the data sent by a backend system of a trading partner such that the Trading Grid can provide the appropriate data services for the trading partner, for example, for tracking purposes.

Parsing can also be needed to split the data sent by a backend system. For instance, following the above example, an ERP document may contain POs for multiple trading partners in no particular order—a PO for trading partner A, a PO for trading partner B, another PO for trading partner A, a PO for trading partner X, etc. The parsing framework can parse out these POs (e.g., breaking down the ERP data by POs based on a syntactic analysis of the structure of the ERP document). Through additional data services, the Trading Grid can identify which PO is for what trading partner, package the POs by trading partner, track them, and deliver them.

As discussed above, the application can be any application that needs parsing done in the Trading Grid. As a non-limiting example, the application can be a Trading Grid application that implements a managed service provided by the Trading Grid. The application can run on a computer at the client side or at the server side. In some embodiments, the application runs on a server machine on the Trading Grid.

The application can open a file that it want parsed and make the initial call to the parsing framework. This creates an input stream at the application layer and instantiates the parsing framework. In some embodiments, the input stream can be a Java input/output (I/O) stream supported by the parsing framework.

The application can utilize observer design patterns (e.g., observer design patterns 324 shown in FIG. 3) to instantiate observers needed to monitor the parsing of the input stream by the parsing framework. There could be one or a thousand observers for one application. Each observer can be configured to be notified when an activity of interest occurs in the parsing framework. However, there is no need to re-parse a thousand (or multiple) times. The parsing framework can notify all interested observers in one singe parsing pass.

The observers are registered with the parsing framework (or, more specifically, with the observer manager at IOC layer 420) and parsing is initiated. As an example, referring to FIG. 5, these actions can be performed by application 502 via an "attach" method call and a "parse" method call to IOC layer 520. From the perspective of the application, control of process flow 400 to parse the ERP document is inverted to the parsing framework. From the perspective of the parsing framework, process flow 400 begins with receiving an input stream from the application (401) and registering observers that are instantiated by the application (403) at IOC layer 420. With parsing initiation (405), process flow 400 moves to parser controller layer 430 where a parser controller operates.

Based on the format information on the input stream, the parser controller can determine which parser handles the type of document (e.g., text, word processing document, spreadsheet, etc.) that the application is requesting to be parsed (431). The parser controller can then instantiate the appropriate parser(s) thus determined (433). The parsers at parser implementations layer 440 need not have any knowledge of the name of the document opened by the application at the application layer. In this way, disparate parser implementations can be normalized and decoupled from the observers and from the application layer generally. This separation provides reusability for the parsers and eliminates the need to hard code a program to connect one parser to one observer.

At parser implementations layer 440, the parser(s) thus instantiated by the parser controller may operate to parse the input stream (e.g., data from an ERP, EDI, SAP, XML, UDF document, etc.) in a single pass (441). The parser does not open the file directly, but is reading the input stream created at the application layer. While the parser(s) is/are performing the single pass of parsing, the findings (parsing outcomes) are communicated by the parsers to the parser controller at parser controller layer 430 via callbacks (443). The parser controller, if necessary, can process (e.g., convert, normalize, etc.) the callbacks in a uniform manner and communicate same to the observer manager at IOC layer 420 (435). The observer manager can determine which observer(s) is/are to be notified of the parsing outcomes and generate parsing notification(s) accordingly (407). The observer manager can dispatch the parsing notification(s) directly to the observer(s) thus determined (409). This process continues until parsing is completed (445). The observer manager can send the parsing notification(s) directly to the observer(s) using the callback method(s) attached (by registration) to the observer(s). In some embodiments, callbacks can also be normalized to hide complexity of different data types/structures from observers. Once awaken by a callback, each observer can start to handle the outputs and communicates with the application regarding same. Once parsing is completed, control is no longer inverted and the application can proceed, for instance, to package the parsed data and make a call to a target destination to deliver the package of data.

Example Use Cases

Figure 5:
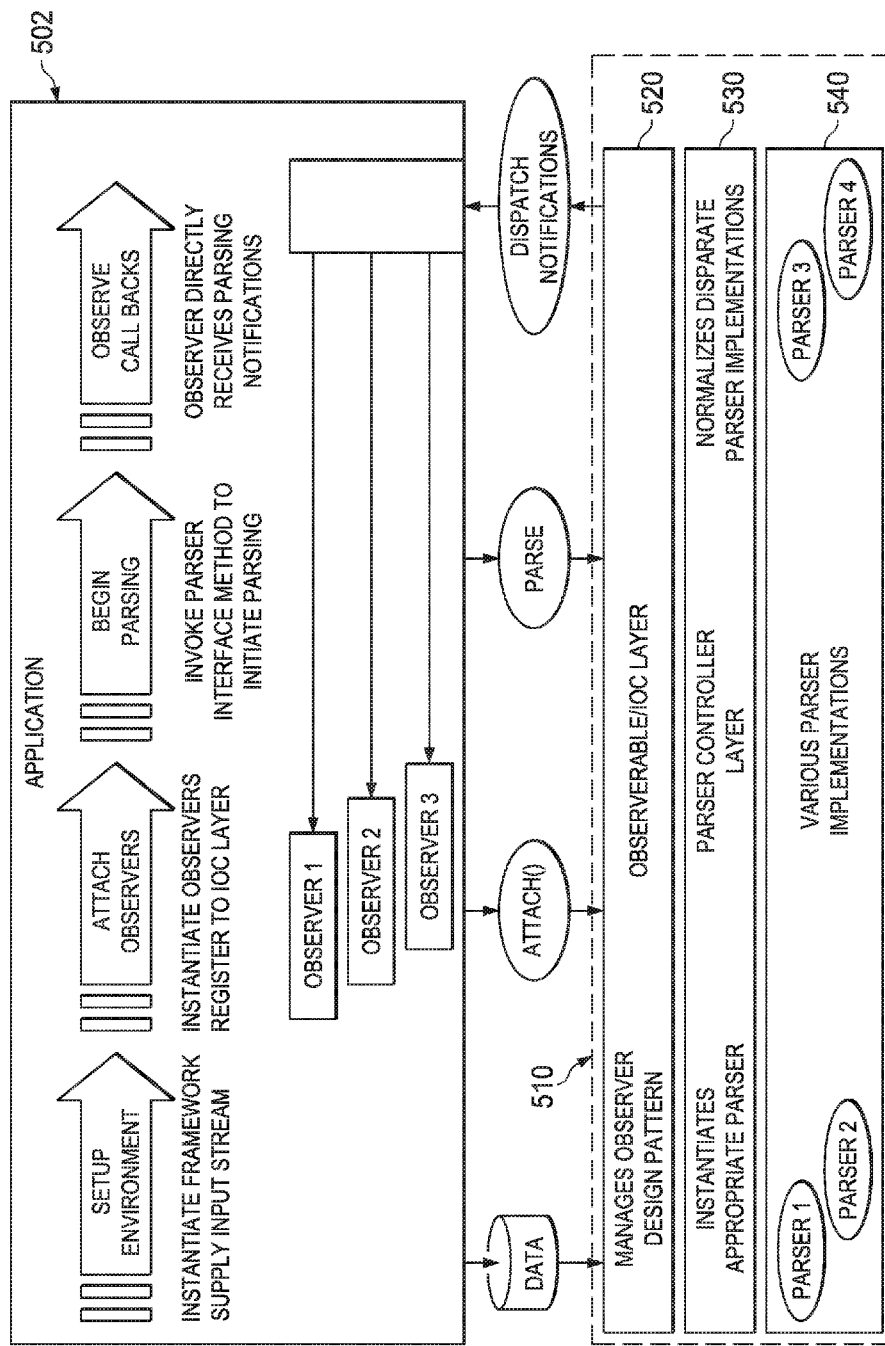
FIG. 5 depicts a flow diagram of an example embodiment of an application with three observers and a parsing framework with an observable layer, a parser controller layer, and a parser implementations layer with four parsers according to some embodiments.

FIG. 5 depicts a flow diagram of an example embodiment of application 502 with three observers and parsing framework 510 with IOC layer 520, parser controller layer 530, and parser implementations layer 540 with four parsers. These components may implement process flow 400 described above with reference to FIG. 4 to support TG services (e.g., Trading Grid (TG) Key Collection Service, TG Splitting Service, etc.) that require parsing. In some embodiments, parsing framework 510 may be encapsulated in an independent lightweight reusable library (not coupled to the TG Translation Service) and have the ability to "plug-in" various parsing assets and implementations.

In some embodiments, the parsing service may be exposed as a JAR (Java Archive—a package file format for distribution). Interfaces between the layers are defined and formalized for invocation and callbacks. Furthermore, the parsing framework requires as little metadata and provisioning parameters as possible. The streaming callback implementation can provide a technical effect of low memory consumption. As a non-limiting example, a parsing framework distribution file "ParsingService.jar" may take up only about 530 KB in size.

Embodiments of a parsing framework disclosed herein can provide many advantages. For example, it can facilitate registered observers to perform processing as parsing is being performed. It can provide an observer to "request" notification of multiple "interests" and for multiple observers to be notified of the same "interest" in a single parse. It can provide inter-observer notifications as well. Furthermore, the observer controller, and the parser controller, can prevent coupling of the observers directly to the parsers. Inter-observer notifications can be done leveraging external interfaces (XIF).

The parsing framework provides a signature of normalized callbacks for common/logical structures and processing markers (e.g., "Start Parse," "Start Interchange," "Start Group," "Start Transaction," "End Parse," "End Interchange," "End Group," "End Transaction"). Such logical structures can help with various processing needs such as generating XIF levels and counts and allows for easy implementation of observers that are irrespective of format (e.g., count Interchanges, transactions, etc. regardless of format). Additionally, for "well known formats such as EDI and SAP, the parsing framework provides callback objects which are format-specific (e.g., Segment and Elements objects in EDI parsing).

Figure 6:
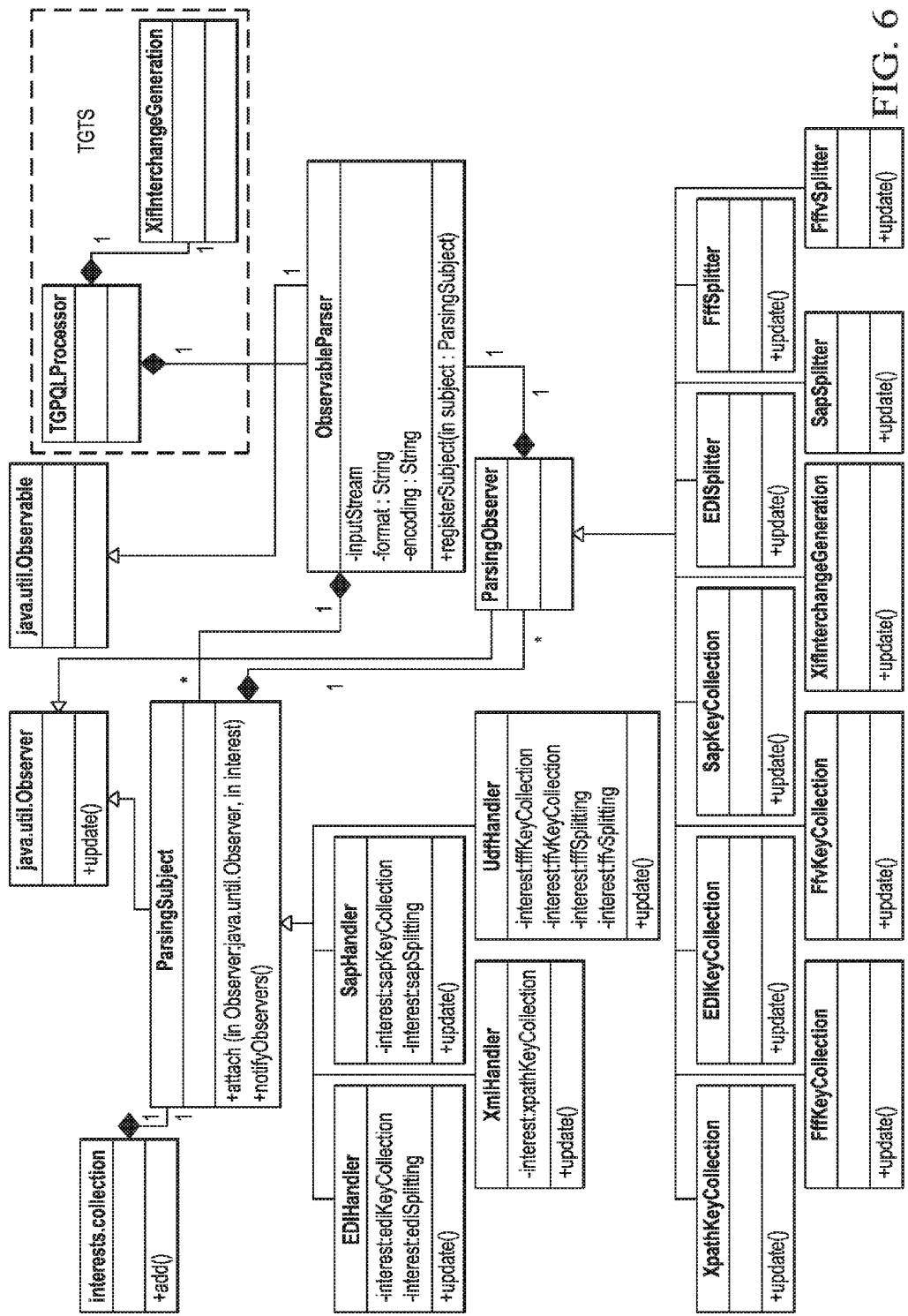
FIG. 6 depicts example logical structures for an observer layer of a parsing framework according to some embodiments.
Figure 10:
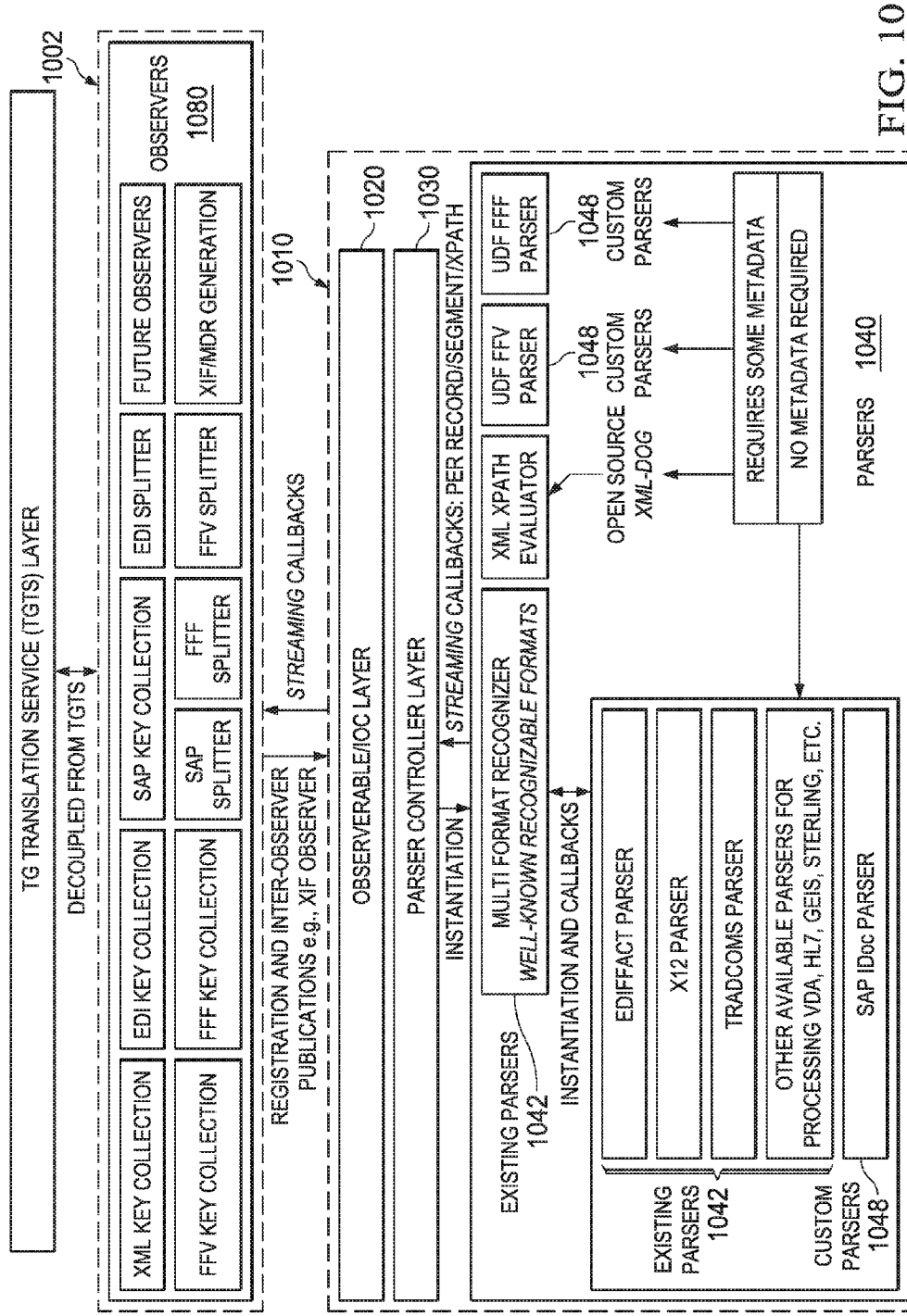
FIG. 10 depicts a flow diagram showing an example of an application with a plurality of observers and an example of an extensible parsing framework with an IOC layer, a parser controller layer, and a parser implementations layer with various parsers according to some embodiments.

Example logical structures for an observer layer are illustrated in FIG. 6. An example of an EDI observer "MyEDIObserver" snippet to print all the segments of an EDI stream is shown in FIG. 7. At runtime, this EDI observer can be attached using an "attach( )" method. An example of this method is shown in FIG. 8. An example of parsing outcome from the EDI stream is shown in FIG. 9. As illustrated in FIG. 10, various types of parsers (e.g., SAP Idoc parser, user defined function (UDF) parser, XML parser, etc.) can be utilized to parse stream in various formats.

FIG. 10 depicts a flow diagram showing an example of application 1002 with observers 1080 and an example of extensible parsing framework 1010 with IOC layer 1020, parser controller layer 1030, and parser implementations layer 1040. These components may implement process flow 400 described above with reference to FIG. 4. In the example of FIG. 10, observers 1080 are set up to observer multiple functions performed by parsing framework 1010, including key collection and splitting. These are explained below.

Key collection—entities may log in to a portal (e.g., a web based interface) to inquire information on specific document types such as Invoices, Purchase Order, etc. For instance, when did a particular Purchase order and/or Invoice go through, how many Purchase Orders are associated with a sender (e.g., via a sender identifier or ID), etc. The parsing framework disclosed herein can collect keys/fields such as sender ID, receiver ID, invoice ID, Purchase Order ID, and/or secondary collection—collection date/time, etc. that can be used for analytics.

Splitting—some documents are split into logical chunks for processing. An Observer can be written to collect all the records for an entity up to certain point and then write another file. The parsing framework allows multiple observers doing different things to the same document in one parsing. Parsers are decoupled from the observers and have no knowledge why they are instantiated to perform the parsing. This allows the observers to function independently of the reasons for parsing.

In the example of FIG. 10, parsers operating at layer 1040 include hardwired parsers 1042 and extensible parsers 1048. As discussed above, some embodiments of a parsing framework disclosed herein can be extended to include new customer parser(s) and/or to replace existing parser(s). That is, configurable dependency (metadata) injection may be used, alternatively or additionally, to hard-coded instantiations of observers, subjects, and parsers.

In some embodiments, dependency injection can be achieved by producing generic or universal representation (e.g., Document Object Model or DOM) of Java objects that can be readily, easily, and natively consumed by Java programs. Each DOM is a representation of a document. DOM is more than a text file. It represents a structure of a document. For example, an EDI document may be represented by a DOM has a name of a person. Under that name there maybe five records that are address information. For each address, there may be a new name to that record. Thus, a DOM structure is a much richer representation of a document which can be serialized and consumed by any Java application very easily via an API. In the example of FIG. 10, parsers 1048 would need some metadata succinctly defined for a document in order to create a DOM, for instance, for XML and UDF parsing, while parsers 1042 would not require any metadata.

The parsing framework can support the Trading Grid such that parsing only needs to be done once and can feed (e.g., pass the same DOM) to all services on the Trading Grid. This eliminates the need to perform parsing on a document multiple times and can significantly reduce the processing time.

Other implementations are also possible. For example, a service may convert an Excel (.xlsx) data to "comma-separated values" (CSV) files, so there can be an Excel parser providing an outcome to CSV observer. Furthermore, a service may insert header records into a header-less UDF file.

Figure 11:
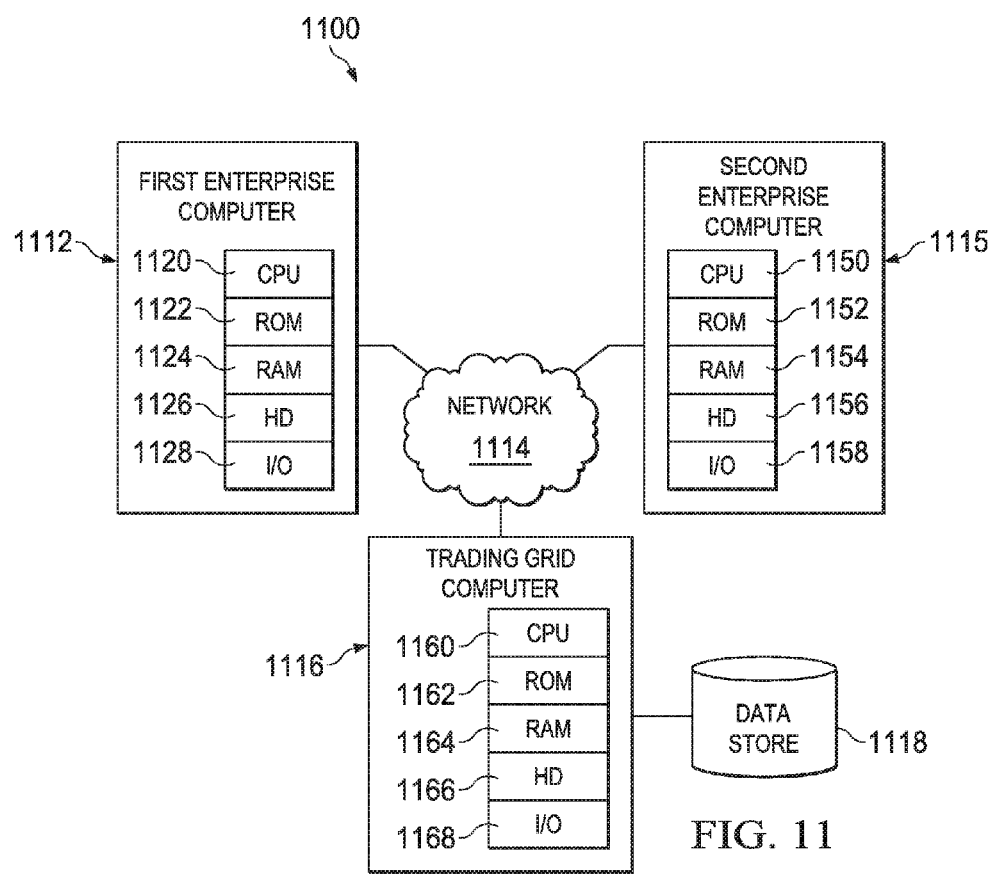
FIG. 11 depicts a diagrammatic representation of a distributed network computing environment where embodiments disclosed can be implemented.

FIG. 11 depicts a diagrammatic representation of a distributed network computing environment where embodiments disclosed can be implemented. In the example illustrated, network computing environment 1100 includes network 1114 that can be bi-directionally coupled to first enterprise computer 1112, second enterprise computer 1115, and Trading Grid computer 1116. Trading Grid computer 1116 can be bi-directionally coupled to data store 1118. Network 1114 may represent a combination of wired and wireless networks that network computing environment 1100 may utilize for various types of network communications known to those skilled in the art.

For the purpose of illustration, a single system is shown for each of first enterprise computer 1112, second enterprise computer 1115, and Trading Grid computer 1116. However, within each of first enterprise computer 1112, second enterprise computer 1115, and Trading Grid computer 1116, a plurality of computers (not shown) may be interconnected to each other over network 1114. For example, a plurality of first enterprise computers 1112 and a plurality of second enterprise computers 1115 may be coupled to network 1114. First enterprise computers 1112 may include data processing systems operating at the backend of an enterprise network and communicating with Trading Grid computer 1116 over network 1114. Second enterprise computers 1115 may include data processing systems operating at the backend of an enterprise network and communicating with Trading Grid computer 1116 over network 1114.

First enterprise computer 1112 can include central processing unit ("CPU") 1120, read-only memory ("ROM") 1122, random access memory ("RAM") 1124, hard drive ("HD") or storage memory 1126, and input/output device(s) ("I/O") 1128. I/O 1129 can include a keyboard, monitor, printer, electronic pointing device (e.g., mouse, trackball, stylus, etc.), or the like. First enterprise computer 1112 can include a desktop computer, a laptop computer, a personal digital assistant, a cellular phone, or nearly any device capable of communicating over a network. Second enterprise computer 515 may be similar to first enterprise computer 1112 and can comprise CPU 1150, ROM 1152, RAM 1154, HD 1156, and I/O 1158.

Likewise, Trading Grid computer 1116 may include CPU 1160, ROM 1162, RAM 1164, HD 1166, and I/O 1168. Trading Grid computer 1116 may include one or more backend systems configured for providing a variety of services to first enterprise computers 1112 over network 1114. These services may utilize data stored in data store 1118. Many other alternative configurations are possible and known to skilled artisans.

Each of the computers in FIG. 11 may have more than one CPU, ROM, RAM, HD, I/O, or other hardware components. For the sake of brevity, each computer is illustrated as having one of each of the hardware components, even if more than one is used. Each of computers 1112, 1115, and 1116 is an example of a data processing system. ROM 1122, 1152, and 1162; RAM 1124, 1154, and 1164; HD 1126, 1156, and 1166; and data store 1118 can include media that can be read by CPU 1120, 1150, or 1160. Therefore, these types of memories include non-transitory computer-readable storage media. These memories may be internal or external to computers 1112, 1115, or 1116.

Portions of the methods described herein may be implemented in suitable software code that may reside within ROM 1122, 1152, or 1162; RAM 1124, 1154, or 1164; or HD 1126, 1156, or 1166. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
   receiving, by a parsing framework embodied on non-transitory computer memory, an input stream from an application, the application having observers, each observer associated with a function of the application, the parsing framework comprising an observer manager, a parser controller, and a plurality of parsers, the observation manager structurally insulating the plurality of parsers from the application and the observers, wherein the application attaches the observers to the parsing framework and initiates parsing of the input stream by the parsing framework and wherein control of the parsing is inverted to the parsing framework;
   determining a parser of the plurality of parsers based at least in part on a format of the input stream, the determining performed by the parser controller;
   instantiating the parser thus determined, the instantiating performed by the parser controller;
   parsing the input stream, the parsing performed by the parser determined by the parser controller;
   determining which of the observers is to be notified of an outcome from the parsing, the determining performed by the observer manager;
   generating at least one parsing notification, the generating performed by the observer manager; and
   dispatching the at least one parsing notification directly to any or all of the observers determined by the observer manager of the parsing framework to be notified of the outcome from the parsing, the dispatching performed by the observer manager.

2. The method according to claim 1, wherein the observer manager, the parser controller, and the plurality of parsers represent different layers of the parsing framework, the parser controller operating at a parser controller layer between an observer manager layer and a parser implementations layer, separating the plurality of parsers from the observer manager.

3. The method according to claim 1, wherein the parser communicates a finding to the parser controller, wherein the parser controller processes the finding into the outcome and communicates the outcome to the observer manager, and wherein the parser controller processes disparate findings by the plurality of parsers into outcomes having a uniform representation.

4. The method according to claim 1, wherein the observers are instantiated by the application utilizing observer design patterns residing on the parsing framework.

5. The method according to claim 1, wherein the parsing framework is instantiated by the application and wherein when parsing of the input stream is complete, control reverts back to the application.

6. The method according to claim 1, wherein the application runs on a server machine operating on an electronic information exchange platform, the application implementing a service provided by the electronic information exchange platform.

7. The method according to claim 1, wherein the outcome from the parser comprises reusable parsing components including at least one of a record, a field of the record, a file, or a segment of the file.

8. A system, comprising:
a processor;
a non-transitory computer memory; and
stored instructions translatable by the processor to perform:
receiving, by a parsing framework embodied on the non-transitory computer memory, an input stream from an application, the application having observers, each observer associated with a function of the application, the parsing framework comprising an observer manager, a parser controller, and a plurality of parsers, the observation manager structurally insulating the plurality of parsers from the application and the observers, wherein the application attaches the observers to the parsing framework and initiates parsing of the input stream by the parsing framework and wherein control of the parsing is inverted to the parsing framework;
determining a parser of the plurality of parsers based at least in part on a format of the input stream, the determining performed by the parser controller;
instantiating the parser thus determined, the instantiating performed by the parser controller;
parsing the input stream, the parsing performed by the parser determined by the parser controller;
determining which of the observers is to be notified of an outcome from the parsing, the determining performed by the observer manager;
generating at least one parsing notification, the generating performed by the observer manager; and
dispatching the at least one parsing notification directly to any or all of the observers determined by the observer manager of the parsing framework to be notified of the outcome from the parsing, the dispatching performed by the observer manager.

9. The system of claim 8, wherein the observer manager, the parser controller, and the plurality of parsers represent different layers of the parsing framework, the parser controller operating at a parser controller layer between an observer manager layer and a parser implementations layer, separating the plurality of parsers from the observer manager.

10. The system of claim 8, wherein the parser communicates a finding to the parser controller, wherein the parser controller processes the finding into the outcome and communicates the outcome to the observer manager, and wherein the parser controller processes disparate findings by the plurality of parsers into outcomes having a uniform representation.

11. The system of claim 8, wherein the observers are instantiated by the application utilizing observer design patterns residing on the parsing framework.

12. The system of claim 8, wherein the parsing framework is instantiated by the application and wherein when parsing of the input stream is complete, control reverts back to the application.

13. The system of claim 8, wherein the application runs on a server machine operating on an electronic information exchange platform, the application implementing a service provided by the electronic information exchange platform.

14. The system of claim 8, wherein the outcome from the parser comprises reusable parsing components including at least one of a record, a field of the record, a file, or a segment of the file.

15. A computer program product comprising a non-transitory computer readable medium storing instructions translatable by a processor to implement a parsing framework, the parsing framework operable to perform:
receiving an input stream from an application, the application having observers, each observer associated with a function of the application, the parsing framework comprising an observer manager, a parser controller, and a plurality of parsers, the observation manager structurally insulating the plurality of parsers from the application and the observers, wherein the application attaches the observers to the parsing framework and initiates parsing of the input stream by the parsing framework and wherein control of the parsing is inverted to the parsing framework;
determining a parser of the plurality of parsers based at least in part on a format of the input stream, the determining performed by the parser controller;
instantiating the parser thus determined, the instantiating performed by the parser controller;
parsing the input stream, the parsing performed by the parser determined by the parser controller;
determining which of the observers is to be notified of an outcome from the parsing, the determining performed by the observer manager;
generating at least one parsing notification, the generating performed by the observer manager; and
dispatching the at least one parsing notification directly to any or all of the observers determined by the observer manager of the parsing framework to be notified of the outcome from the parsing, the dispatching performed by the observer manager.

16. The computer program product of claim 15, wherein the parser communicates a finding to the parser controller, wherein the parser controller processes the finding into the outcome and communicates the outcome to the observer manager, and wherein the parser controller processes disparate findings by the plurality of parsers into outcomes having a uniform representation.

17. The computer program product of claim 15, wherein the observers are instantiated by the application utilizing observer design patterns residing on the parsing framework.

18. The computer program product of claim 15, wherein the parsing framework is instantiated by the application and wherein when parsing of the input stream is complete, control reverts back to the application.

19. The computer program product of claim 15, wherein the application runs on a server machine operating on an electronic information exchange platform, the application implementing a service provided by the electronic information exchange platform.

20. The computer program product of claim 15, wherein the outcome from the parser comprises reusable parsing components including at least one of a record, a field of the record, a file, or a segment of the file.

* * * * *